United States Patent
Oohira et al.

(10) Patent No.: US 10,469,313 B2
(45) Date of Patent: Nov. 5, 2019

(54) DATA FILE REGISTRATION MANAGEMENT SYSTEM, METHOD, MANAGEMENT APPARATUS, AND RECORDING MEDIUM

(71) Applicant: NEC CORPORATION, Tokyo (JP)

(72) Inventors: Mayo Oohira, Tokyo (JP); Junichi Gokurakuji, Tokyo (JP); Atsushi Hashiguchi, Tokyo (JP); Hibiki Ogura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 103 days.

(21) Appl. No.: 15/546,330

(22) PCT Filed: Jan. 28, 2016

(86) PCT No.: PCT/JP2016/052524
§ 371 (c)(1),
(2) Date: Jul. 26, 2017

(87) PCT Pub. No.: WO2016/121882
PCT Pub. Date: Aug. 4, 2016

(65) Prior Publication Data
US 2018/0270111 A1    Sep. 20, 2018

(30) Foreign Application Priority Data
Jan. 29, 2015  (JP) ................. 2015-015971

(51) Int. Cl.
*G06F 9/455*    (2018.01)
*H04L 12/24*    (2006.01)
(Continued)

(52) U.S. Cl.
CPC ...... *H04L 41/0803* (2013.01); *G06F 9/45558* (2013.01); *G06F 9/46* (2013.01);
(Continued)

(58) Field of Classification Search
CPC ............. H04L 41/0803; G06F 9/5077; G06F 9/45558; G06F 9/46; G06F 2009/45595; G06F 2009/45583
See application file for complete search history.

(56) References Cited

U.S. PATENT DOCUMENTS 6,023,733 A * 2/2000 Periasamy ............ H04L 45/00
709/241
6,233,653 B1 * 5/2001 Abe .................... G06F 12/0866
711/113
(Continued)

FOREIGN PATENT DOCUMENTS

| EP | 2 765 508 A1 | 8/2014 |
| JP | 2003-091421 A | 3/2003 |
| JP | 2013-190983 A | 9/2013 |

OTHER PUBLICATIONS

Annex B (informative): VNF lifecycle management, ETSI GS NFV-MAN 001, Dec. 12, pp. 102-108, V1.1.1, <http://www.etsi.org/deliver/etsi_gs/NFV-MAN/001_099/001/01.01.01_60/gs_NFV-MAN001v010101p.pdf>.

(Continued)

*Primary Examiner* — Adam Lee
(74) *Attorney, Agent, or Firm* — Sughrue Mion, PLLC

(57) ABSTRACT

The present invention provides a registration management method capable of suppressing influence of data file forwarding load upon processing, and suitable for application to for example VNF Package on-boarding. A data file required for registration is placed in advance on a side of a management apparatus that performs registration processing, and at a registration stage, a registration request is made to the management apparatus by specifying the data file placed on the management apparatus side.

16 Claims, 15 Drawing Sheets

(51) Int. Cl.
*G06F 9/46* (2006.01)
*G06F 9/50* (2006.01)

(52) U.S. Cl.
CPC .. *G06F 9/5077* (2013.01); *G06F 2009/45583* (2013.01); *G06F 2009/45595* (2013.01)

(56) References Cited

U.S. PATENT DOCUMENTS

| | | | | |
|---|---|---|---|---|
| 6,256,675 | B1* | 7/2001 | Rabinovich | H04L 29/06 709/225 |
| 7,003,579 | B1* | 2/2006 | Johansson | H04L 67/06 709/230 |
| 7,010,590 | B1* | 3/2006 | Munshi | H04L 63/0464 709/224 |
| 8,825,964 | B1* | 9/2014 | Sopka | G06F 3/0671 711/152 |
| 8,953,446 | B1* | 2/2015 | Wang | H04L 12/4641 370/231 |
| 8,976,647 | B2* | 3/2015 | Song | H04L 47/125 370/229 |
| 9,083,604 | B2 | 7/2015 | Fujiwara | |
| 2002/0083194 | A1* | 6/2002 | Bak | H04L 45/00 709/238 |
| 2002/0087722 | A1* | 7/2002 | Datta | H04L 29/12066 709/239 |
| 2007/0043860 | A1* | 2/2007 | Pabari | G06F 9/5072 709/224 |
| 2008/0104391 | A1* | 5/2008 | Fukuta | H04L 63/0272 713/153 |
| 2008/0126525 | A1* | 5/2008 | Ueoka | H04L 43/0817 709/223 |
| 2010/0017519 | A1* | 1/2010 | Han | H04W 4/02 709/227 |
| 2010/0100881 | A1 | 4/2010 | Shigeta et al. | |
| 2010/0235481 | A1* | 9/2010 | Deutsch | H04L 29/12367 709/222 |
| 2011/0004676 | A1 | 1/2011 | Kawato | |
| 2011/0126110 | A1 | 5/2011 | Vilke et al. | |
| 2011/0276708 | A1* | 11/2011 | Rogan | H04L 45/22 709/230 |
| 2012/0185499 | A1 | 7/2012 | Alpern et al. | |
| 2012/0246319 | A1* | 9/2012 | Um | G06F 9/5061 709/226 |
| 2013/0219482 | A1* | 8/2013 | Brandt | H04L 65/607 726/9 |
| 2013/0238802 | A1* | 9/2013 | Sarikaya | H04L 29/08153 709/226 |
| 2013/0246596 | A1 | 9/2013 | Fujiwara | |
| 2013/0297796 | A1* | 11/2013 | Young | H04L 67/1008 709/226 |
| 2014/0010109 | A1* | 1/2014 | Himura | H04L 41/12 370/254 |
| 2014/0019621 | A1* | 1/2014 | Khan | G06F 9/4856 709/226 |
| 2014/0086177 | A1* | 3/2014 | Adjakple | H04W 12/08 370/329 |
| 2014/0098814 | A1* | 4/2014 | Bansal | G06F 9/542 370/390 |
| 2014/0181248 | A1* | 6/2014 | Deutsch | H04L 49/354 709/217 |
| 2014/0229945 | A1* | 8/2014 | Barkai | H04L 49/70 718/1 |
| 2014/0317716 | A1* | 10/2014 | Chao | H04L 63/10 726/9 |
| 2015/0117455 | A1* | 4/2015 | Umesh | H04L 45/38 370/392 |
| 2015/0156122 | A1* | 6/2015 | Singh | H04L 47/20 370/235 |
| 2015/0156270 | A1* | 6/2015 | Teraoka | G06F 13/00 709/219 |
| 2016/0048464 | A1* | 2/2016 | Nakajima | G06F 12/1475 711/152 |
| 2016/0057208 | A1* | 2/2016 | Parikh | H04L 67/10 714/4.11 |
| 2016/0335111 | A1* | 11/2016 | Bruun | G06F 9/45558 |

OTHER PUBLICATIONS

Luigi Grossi et al., "SDN E NFV: Quali Sinergie?", Notiziario Tecnico, Jul. 2014, pp. 48-65.
International Search Report of PCT/JP2016/052524 dated Apr. 19, 2016 [PCT/ISA/210].
Communication dated Dec. 19, 2017, from European Patent Office in counterpart application No. 16743485.1.
Tsubouchi et al., "NFV Management and Orchestration Technology to Automatically Build Network Services on Demand", IEICE Technical Report, The Institute of Electronics, Information and Communication Engineers, vol. 114, No. 206, pp. 107-112, Sep. 4, 2014, Japan, 7 pages total.
Notice of Reasons for Refusal dated Sep. 3, 2019 issued by the Japanese Patent Office in counterpart Japanese Application No. 2016-572151.

* cited by examiner

Figure 5.1: The NFV-MANO architectural framework with reference points

FIG. 2                              Related Art

Network Service Descriptor(NSD)
Virtual Link Descriptor(VLD)
VNF Forwarding Graph Descriptor(VNFFGD)
VNF Descriptor (VNFD)
Physical Network Function Descriptor(PNFD)

Network Service Record (NSR)
VNFFG Record (VNFFGR)
Virtual Link Record (VLR)
VNF Record (VNFR)
PNF Record (PNFR)

FIG. 4A        Related Art

Figure B.2: VNF Package on-boarding message flow

DATA FILE REGISTRATION MANAGEMENT SYSTEM, METHOD, MANAGEMENT APPARATUS, AND RECORDING MEDIUM

CROSS REFERENCE TO RELATED APPLICATIONS

This application is a National Stage of International Application No. PCT/JP2016/052524, filed Jan. 28, 2016, claiming priority based on Japanese Patent Application No. 2015-015971, filed Jan. 29, 2015, the contents of all of which are incorporated herein by reference in their entirety.

TECHNICAL FIELD

The present invention relates to a data file registration management system, method, management apparatus, and recording medium, and particularly to a data file registration management system, method, management apparatus, and program suitable for application to management and orchestration of network functions virtualization.

BACKGROUND

There is known NFV (Network Functions Virtualization) or the like configured to implement a network apparatus and so on in software, using a virtualization technology that virtualizes hardware resources (computing, storage, network functions and so on) of a server by a virtual machine (VM: Virtual Machine) implemented on a virtualization layer (Virtualization Layer) such as a hypervisor (HyperVisor) on the server. The NFV is implemented, based on a MANO (Management & Orchestration) architecture, for example. FIG. 1 is a diagram cited from FIG. 5.1 (The NFV-MANO architectural framework with reference points) on page 23 of Non Patent Literature 1.

Referring to FIG. 1, VNF (Virtualized Network Function) corresponds to an application or the like running on a virtual machine (VM) on a server, and implements a network function in software. As VNF, MME (Mobility Management Entity), S-GW (Serving Gateway), P-GW (PDN Gateway), and so forth on EPC (Evolved Packet Core) that is a core network of LTE (Long Term Evolution) network may be implemented by software (virtual machine). In the example of FIG. 1, a management function referred to as EM (Element Manager: element management) is provided for each VNF, for example.

NFVI (Network Function Virtualization Infrastructure) that constitutes an implementation infrastructure of each VNF is an infrastructure that allows hardware resources of a physical machine (server) such as computing, storage, and network functions to be flexibly handled as virtualized hardware resources such virtualized computing, virtualized storage, virtualized network, and so on which have been virtualized using a virtualization layer such as a hypervisor.

NFV MANO (Management & Orchestration) includes an NFV-Orchestrator (NFVO), a VNF-manager (VNFM), and a Virtualized Infrastructure Manager (VIM).

The NFV-Orchestrator (NFVO) performs orchestration of NFVI resources and lifecycle management (such as Instantiation, Scaling, Termination, and Update of each NS instance) of NSs (Network Services). The NFV-Orchestrator also performs management of an NS catalog (NSD/VLD/VNFFGD) and a VNF catalog (VNFD/VM images/manifest files, etc.), and includes a repository of NS instances and a repository of the NFVI resources.

The VNF-Manager (VNFM) performs VNF lifecycle management (such as instantiation, update, query, scaling, termination, etc.) and event notification.

The virtualized Infrastructure Manager (VIM) performs control of the NFVI (such as computing, storage, network resource management, fault monitoring of the NFVI being the implementation infrastructure of the NFV, and monitoring of resource information) through the virtualization layer.

OSS (Operations Support Systems) are a generic term for systems (such as apparatuses, software, and schemes) necessary for telecommunications carriers (carriers) to construct and manage services, for example. BSS (Business Support systems) are a generic term for information systems (such as apparatuses, software, and schemes) to be used for accounting for and charging of a usage charge and handling of a customer by the telecommunications carriers.

The NS Catalogue (NS catalog: an NS Catalogue in FIG. 1) represents repository of network Services. NS Catalogue supports creation and management of NS deployment templates (Network Service Descriptor (NSD), Virtual Link Descriptor (VLD), and VNF Forwarding Graph Descriptor (VNFFGD)).

The VNF catalog (VNF catalog: a VNF Catalogue in FIG. 1) represents repository of VNF packages. The VNF catalog supports creation and management of each VNF package of a VNF Descriptor (VNFD), a software image, a manifest file and so forth.

The NFV instance repository (NFV instances Repository: NFV Instances in FIG. 1) holds information of all VNF instances and Network Service instances. Each VNF instance and each NS instance are represented respectively by a VNF record and by an NS record. Those records are updated during a lifecycle of the respective instances, reflecting changes resulting from execution of NS lifecycle management operations and/or VNF lifecycle management operations.

The NFVI resources repository (NFVI Resources Repository: NFVI Resources in FIG. 1) holds information on available (available)/reserved (reserved)/allocated (allocated) resources as extracted by the VIM across operator's infrastructure domains.

Referring to FIG. 1, a reference point Os-Nfvo is a reference point between the OSS (Operation Service Systems)/BSS (Business Service Systems) and the NFVO, and is used for forwarding a lifecycle management request of each network service, a VNF lifecycle management request, state information associated with NFV, exchange of policy management information, and so on.

A reference point Vi-Vnfm is used for a resource allocation request from VNFM and exchange of virtualized resource configuration and state information.

A reference point Ve-Vnfm-em is used between the EM and the VNFM for VNF instantiation, VNF instance retrieval, VNF instance update, VNF instance termination, VNF instance scaling-out/in, VNF instance scaling-up/down, forwarding of configuration and events from EM to VNFM, and notification of configuration and events regarding the VNF from VNFM to EM, and so on.

A reference point Ve-Vnfm-Vnf is used between the VNF and the VNFM for VNF instantiation, VNF instance retrieval, VNF instance update, VNF instance termination, VNF instance scaling-out/in, VNF instance scaling-up/down, forwarding of configuration and events from VNF to VNFM, and notification of configuration and events regarding VNF from VNFM to VNF, and so on.

A reference point Nf-Vi is used for VM allocation with indication of compute/storage resource, update of VM resources allocation, VM migration, VM termination, creation and removal of connection between VMs, etc., virtual resources allocation in response to a resource allocation request, forwarding of virtual resource state information, exchange of configuration and state information of hardware resources, and so on.

A reference point Vn-Nf indicates an execution environment to be provided to the VNF by the NFVI.

A reference point Or-Vnfm is used for a resource-related request (of validation, reservation (reservation), or allocation, etc.) by the VNF-manager (VNFM) and forwarding of configuration information to the VNFM, and collection of VNF state information.

A reference point Or-Vi is used for a resource reservation request and a resource allocation request from the NFVO, and exchange of virtual resource configuration and state information (for details, reference may be made to Non Patent Literature 1).

FIG. 2 is cited from FIG. 6.2 (Information elements in different context) on page 40 of Non Patent Literature 1. An instantiation input parameter is input.

Referring to FIG. 2, a network service descriptor (Network Service Descriptor: NSD) is a network service deployment template for referencing other descriptors that describe components constituting a network service (NS).

A VNF descriptor (VNF Descriptor: VNFD) is a deployment template that describes a VNF in terms of deployment and operational behavior requirements.

The VNFD is mainly used by the VNFM in VNF instantiation (instantiation) and VNF instance lifecycle management. The VNFD is used for a network service and management and orchestration of virtualized resources on the NFVI (automation of deployment/setting/management of a computer system/middleware/service) by the NFVO. The VNFD also contains connectivity, interface and KPIs requirements that can be used by NFV-MANO functional blocks to establish appropriate Virtual Links within the NFVI between its VNFC instances, or between a VNF instance and the endpoint interface to the other network functions.

A VNF Forwarding Graph Descriptor (VNFFGD) is a deployment template that describes a network service topology or a part of the topology by referring to the VNFs, PNFs, and Virtual Links connecting those VNFs and PNFs.

A virtual link descriptor (Virtual Link Descriptor: VLD) is a deployment template that describes resource requirements necessary for links between the VNFs, between the PNFs, and between NS endpoints (endpoints) that can be used by the NFVI.

A physical network function descriptor (Physical Network Function Descriptor: PNFD) describes connectivity (connectivity), interface and KPIs requirements of a virtual link, for a function of an attached physical network. The PNFD is needed when a physical device is incorporated into an NS, and facilitates addition of a network.

The NSD, the VNFFGD, and the VLD are included in the NS catalog (Network Service Catalogue in FIG. 2), and the VNFD is included in the VNF catalogue (VNF Catalogue in FIG. 2) as the VNF package.

An NS or a VNF instantiation operation is performed from the OSS/BSS or the VNFM to the NFVO. As a result of the instantiation operation, each record indicating a newly created instance is created. Each record to be created based on information to be given by each descriptor and additional runtime information related to a component instance provides data for modeling a network service (NS) instance state, for example.

As types of the instance records (of NFV Instances) to be created, there may be listed the following types, for example:
Network Service Record (NSR);
VNFFG Record (VNFFGR);
Virtual Link Record (VLR);
VNF (Virtualized Network Function) Record (VNFR); and
PNF (Physical Network Function) Record (PNFR).

Information elements of the NSR, the VNFR, the VNFFGR, and the VVLR provide a data item group necessary for modeling states of an NS instance, a VNF instance, a VNFFG instance, and a VL instance.

The PNF Record (PNFR) indicates an instance related to a pre-existing PNF which is part of an NS and contains a set of runtime attributes regarding PNF information (including connectivity relevant to the NFVO).

An example of a relationship among VNF, VNFCs (VNF Components) and VDU (Virtualization Deployment Unit) will be described, with reference to FIG. 3. FIG. 3 schematically illustrates an example where VNFC is set for each logical interface in a VNF obtained by virtualizing an S-GW (Serving gateway). Each VDU is an entity used for an information model configured to support description of partial or whole deployment and operational behaviors of the VNF. VNFI configured to provide an implementation infrastructure of the VNF includes a virtual computing, a virtual storage, and a virtual network, each virtualized on a virtualization layer such as a hypervisor. There is provided a virtual machine on a virtualization layer (where the virtual machine includes a virtual CPU (Central Processing Unit), a virtual memory, a virtual storage, and a guest OS (Operating System)), with an application being executed on the guest OS. Compute, Storage, and Network below the virtualization layer schematically represent hardware resources such as a CPU, a storage, and a network interface controller (Network Interface Controller: NIC). Vn-Nf represents an execution environment to be provided to the VNF by the NFVI.

In FIG. 3, where SGW is constituted by VNF, VNFC is configured for each logical interface, logical interfaces S11, Gx, and S5/S8-C with respect to C-Plane (Control Plane) are collectively defined as one VDU (VM), and logical interfaces S1U, S5/S8-U, and S12 with respect to U-Plane are collectively defined as one VDU (VM). C in S5/S8-C represents a control plane (Control Plane). U in the S1U and S5/S8-U represents a user plane (User-plane).

In EPC, S11 is a control plane interface between MME and SGW, S5/S8 is a user plane interface between SGW and PGW, S1U is an interface between eNodeB (evolved NodeB) and Core Network, Gx is an interface between PGW and PCRF (Policy and Charging Rules Function), S11 is an interface between MME and S-GW, S12 is an interface between UTRAN (Universal Terrestrial Radio Access Network) and S-GW.

Each element of NFV is listed and summarized in Tables 1 and 2 below.

FIG. 4B is cited from FIG. B.2: VNF Package on-boarding message flow of Non-Patent Literature 1. FIG. 4A is cited from 7.2.1.2 Operations on page 72 of Non-Patent Literature 1 ("7.2.1 VNF Package management" of "7.2 Interfaces concerning Virtualised Network Functions" on page 71). Main steps for VNF Package on-boarding are as follows. Note that VNF Package on-boarding refers to a process of submitting (submit) VNF Package to NFVO to be included in a catalog. The NFVO verifies (verify) integrity and authenticity of a template supplied from a sender (sender), and, in VNF Package on-boarding, a software image provided in a VNF Package is catalogued in NFVI-Pops (Network Function Virtualization Infrastructure Point of Presence) using support of VIM.

1. Sender submits a VNF Package to NFVO for on-boarding VNFD (VNF Descriptor) using the operation On-board VNF Package of VNF Management interface (VNF Package Management interface). As described in Description of FIG. 4A, the operation of On-board VNF Package submits and validates the VNF Package, and upon successful completion, the VNF Package is stored in the VNF Catalogue and can be used VNF lifecycle management.

2. NFVO validates the VNFD (Validate VNFD).

3. NFVO notifies the catalogue (Notify Catalog).

4. NFVO makes VM image(s) available to each VIM and uploads the VIM images(s) to VIM (Upload image(s)).

Expansion into VNF Package and VM image file is entirely executed in VNF Package on-boarding.

5. VIM acknowledges successful uploading of the image (Ack image(s) uploaded; an Ack: (Acknowledge) response is returned).

6. NFVO acknowledges the VNF Package on-boarding (Ack VNF Package On-boarding; an Ack response is returned to a sending source (Sender)).

It should be noted that a VNF Package refers to a package of a VM image (virtual machine image file), VNF Descriptor (VNFD), etc., constituting a VNF. In Table 3 below, a list of terms related to data file registration management is summarized (some terms in the list of Table 3 also appear as function entities in Table 1; the terms are briefly explained in Table 3).

TABLE 1

| Functional Entity | Description |
| --- | --- |
| OSS/BSS | Comprehensively performs operations/business support. A plurality of EMSs and Orchestrator are deployed on a low-order layer of OSS/BSS. |
| Orchestrator | Orchestration across a plurality of VIMs Management of NS (Network Service) deployment templates and VNF packages Management of instantiation and lifecycle management of NSs Management of instantiation of VNFM Management of VNF instantiation in coordination with VNFM Validation and authorization of NFVI resource request from VNFM Management of integrity and visibility of NS instances through their lifecycle Management of relationship between NS instances and VNF instances, using NFV instances Repository Topology management of NS instances Automated management of NS instances |
| VNF-Manager | Performs VNF lifecycle management * and event notification management. * Instantiation, Auto-Scaling, Auto-Healing, Update, and so on |
| Virtualized Infrastructure Manager (VIM) | Performs resource management and control of NFV infrastructure as follows: Management of computing, storage, and network resources Resource allocation in response to a request Monitoring of a fault state of NFV Infrastructure Monitoring of resource information of NFV Infrastructure |

TABLE 2

| Functional Entity | Description |
| --- | --- |
| Service VND and Infrastructure Description | Defines information templates that become necessary for deploying each Network Service and each VNF NSD: a template that describes requirements and constraint conditions necessary for deployment of the NS VLD: describes resource requirements of a logical link connecting VNFs or connecting PNFs that constitute NS VNFGD: a template that describes a logical topology for and assignment of NS VNFD: a template that describes requirements and constraint conditions necessary for deploying VNF PNFD: describes, for a physical network function, connectivity, external interface, and KPIs requirements of a VL. |
| NS Catalogue | Repository of NSs Management of NS deployment templates (NSD, VLD, VNFFGD) |
| VNF Catalogue | Describes repository of each VNF. Management of each VNF package (VNFD, software images, manifest files, etc.) |
| NFV Instances Repository | Holds instance information of all the VNFs and all the NSs. Information on each instance is described in Record. Record is updated according to lifecycle of each instance. |
| NFVI Resources Repository | Holds information of NFVI resources (NFVI resources as abstracted by VIM across operator's Infrastructure Domains) that are available/reserved/allocated, for abstraction |
| VNF | Refers to a virtualized Network Function and refers to a VM (e.g., MME, SGW, PGW or the like) in which an EPC application is installed, being configured with VNF. |
| EMS | Performs management of FCAPS (FCAPS: Fault, Configuration, Accounting, Performance and Security) of VNF. |
| NFVI | A resource infrastructure in which VNF is executed. Comprises computing, a storage, and a network. Physical resources are abstracted by hypervisor and abstracted resources are managed and controlled by VIM and are provided to VNF. |

TABLE 3

| Term | Description |
| --- | --- |
| Data file | Generic term for files uploaded such as VNF Package and VM images |
| VNF Package | Collection of VM image, VNFD, etc., constituting VNF |
| VM image | VM image file |
| Catalog | Function unit that manages VNF Package in NFVO |
| VM image management | Function unit that manages VM image in VIM |
| work terminal | Terminal on which a maintenance operator operates, Terminal storing Data file, etc. |
| OSS etc. | Operation Support System. Integrated management of multiple NFVOs. Performs operation instruction to NFVOs base on a request from a maintenance operator. |
| NVFO | Integrated management of multiple VIMs. Performs operation instruction to VIM based on a request from OSS. |
| VIM | Infrastructure management. Performs operation of VM and management of Physical server. |
| PM | Physical server on which VM operates |

CITATION LIST

Non-Patent Literature

Non.-Patent Literature 1
ESTI GS NFV-MAN 001 V1.1.1 (2014-12) Network Functions Virtualization (NFV); Management and Orchestration (searched on Jan. 19. 2015)

SUMMARY

Analysis by the present inventors is given below.

In the NFV standard specification such as VNF Package on-boarding described with reference to FIG. 4, data file (e.g. VNF Package and VM image) is registered and forwarded as follows.

(1) An instruction of On-board VNF Package to OSS etc., is supplied from a terminal.

(2) Triggered (trigger) by the On-board VNF Package instruction, the terminal holding the applicable data file forwards the file (VNF Package) to OSS etc., and OSS etc. forwards the file to NFVO (for example, 1. On-boarding VNF Package in FIG. 4B). Further, NFVO forwards the file such as VM image to VIM (for example, 4. Upload image(s) in FIG. 4B).

For example, a VNF Package is a package into which a VM image and VNF Descriptor (VNFD) constituting a VNF are brought together. A image file of VNF in particular is larger in size than files generally dealt in IT (Information Technology) systems.

Therefore, in the technique described above, there is a problem that a forwarding load of a VNF Package and so forth, is large, thereby affecting processing performance (findings by the present inventors).

An object of the present invention invented in consideration of the above problem is to provide a data file registration management system, method, management apparatus, and recording medium storing therein a program each capable of suppressing influence of data file forwarding load upon processing and suited to application to VNF Package on-boarding, for example.

According to an aspect of the present invention, there is provided a data file registration management method comprising: lacing information or data (at least one data file) required for registration in advance on a side of at least one management apparatus that performs registration processing; and making a registration request to the management apparatus side at a registration stage, by specifying the information or data (data file) placed in the management apparatus side.

According to another aspect of the present invention, there is provided a data file registration management system comprising: at least one management apparatus that performs registration processing and a terminal that transmits a registration request to the management apparatus, wherein at least one data file required for registration processing by the at least one management apparatus is placed in advance in the at least one management apparatus, and the terminal makes a registration request to the management apparatus, by specifying the information or data (data file), at a registration stage.

According to yet another aspect of the present invention, there is provided a management apparatus comprising: a first storage unit that retains in advance information or data (data file) required for registration; a second storage unit that stores registration information; a registration reception unit that receives a registration request from a requester; a registration unit that reads the information or data (data file) from the first storage unit, performs processing required for registration, and registers the result in the second storage unit; and a response transmission unit that returns a registration result as a response to the requester.

According to yet another aspect of the present invention, there is provided a non-transitory computer readable recording medium storing therein a program causing a computer to execute processing of receiving a registration request from a requester; processing of reading information or data (data file) required for registration from a first storage unit where the information or data (data file) is placed in advance, performing processing required for registration, and registering the result in a second storage unit; and processing of returning a registration result as a response to the requester. According to an exemplary embodiment, the non-transitory computer readable recording medium storing the program is a CD (Compact Disk), DVD (Digital Versatile Disk), or semiconductor memory.

The present invention is able to suppress influence of data file forwarding load upon processing and is suited to application to VNF Package on-boarding, for example.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 4A is cited from Non-Patent Literature 1.

DERAILED DESCRIPTION

First, a basic mode of the present invention will be described.

<Basic Mode: Apparatus Configuration>

Figure 15:
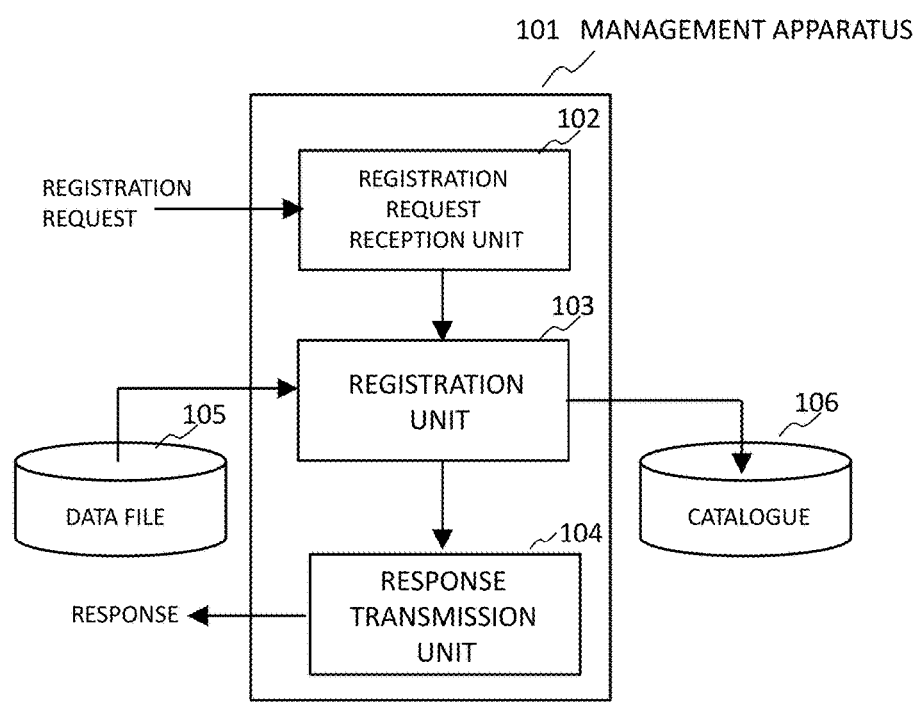
FIG. 15 is a diagram illustrating a basic mode.

FIG. 15 is a diagram illustrating an example of an apparatus configuration according to a basic mode. Referring to FIG. 15, a management apparatus 101 includes a registration request reception unit 102 that receives a registration request from a transmission source (not shown in the drawing), such as a terminal and OSS etc., a registration unit 103 that reads information or data (data file) of a registration target placed (stored) in advance in a storage unit 105, performs required processing (for example verification processing or the like), and stores the information or data in a storage unit 106 (catalogue), and a response transmission unit 104 that returns a response (for example acknowledgment when successful and negative acknowledgment when unsuccessful) to the transmission source when the registration is successful. In the storage unit 105, information or data required for registration as data files is stored in advance of registration execution. At the registration stage, information that identifies the data file is specified as a parameter in a registration request. When the management apparatus 101 is an NFVO, the storage unit 105 stores a VNF Package (including an image file configuring a VNF and template information such as VNFD) as a data file in advance (before registering the VNF Package).

With the above arrangement, it is made possible to suppress influence by a forwarding load of the data file on processing and suitable for application to VNF Package on-boarding and so forth.

The management apparatus 101 may be a VIM. In this case, the storage unit 105 stores a VM image as a data file, in advance, and VM image management information is registered in the storage unit 106.

Processing and function of each unit in the management apparatus 101 in FIG. 15 (or an NFVO or VIM, etc.) may as a matter of course be implemented by a program executed on a computer (processor, CPU (Central Processing Unit)) constituting the management apparatus 101. In this case, the management apparatus 101 is constituted by a computer equipped with a communication function and implements a part of or all of the processing of each unit by reading the program stored in a hard disk drive (Hard Disk Drive) or semiconductor storage apparatus not shown in the drawing and causing the computer to execute the program.

A reference example as a premise of the basic form above will be described.

<Reference Example>

Figure 4B:
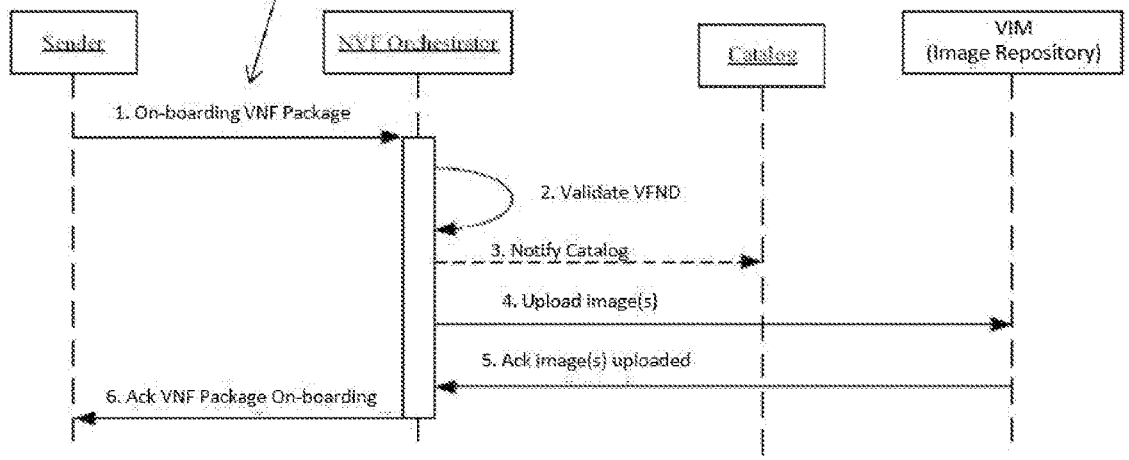
FIG. 4B is cited from Non-Patent Literature 1.
Figure 5:
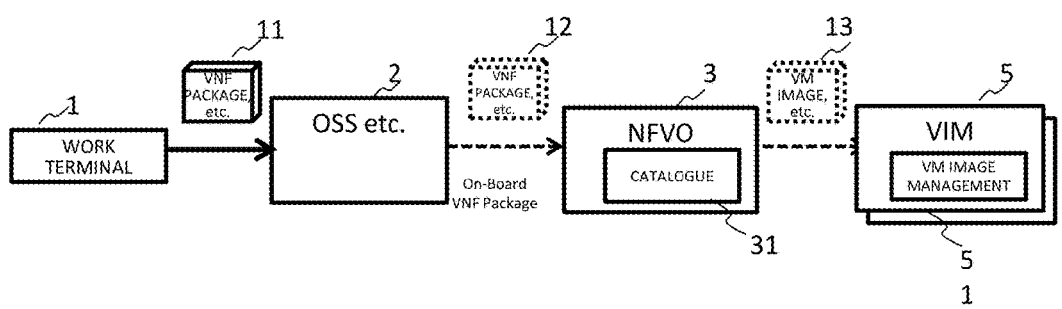
FIG. 5 is a diagram illustrating a reference example.
Figure 6:
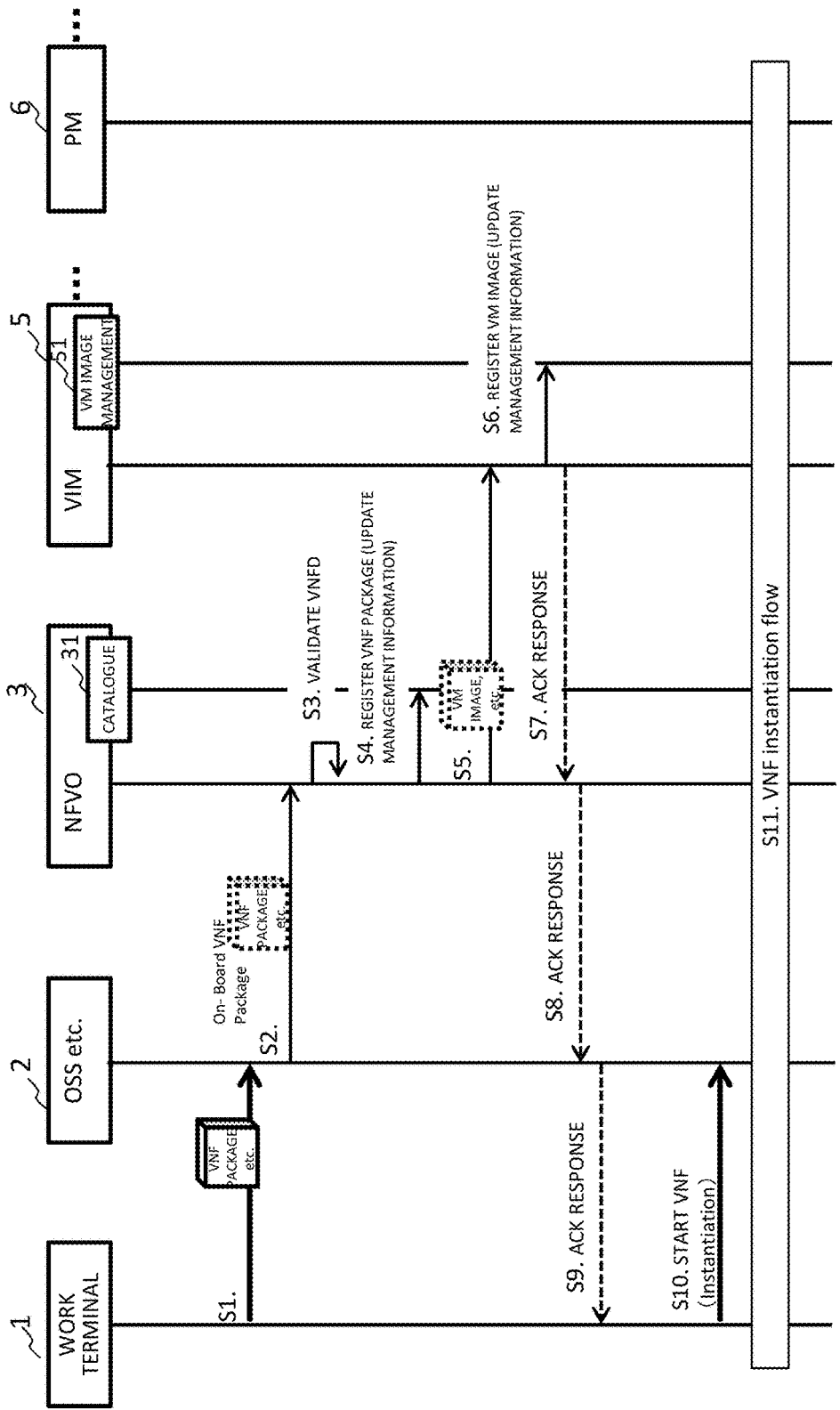
FIG. 6 is a diagram illustrating the reference example.

According to the standard specification of NFV described with reference to FIG. 4, etc., data files (e.g. VNF Package or VM image) are registered and forwarded, for example, as shown in FIGS. 5 and 6. FIGS. 5 and 6 are diagrams illustrating procedures that are supposed by the present inventors to be a reference example. FIG. 5 schematically illustrates a flow of the data files in the system. FIG. 6 schematically illustrates the operation sequence. Sequence numbers are given to typical steps in FIG. 6. Note that OSS etc. 2 in FIG. 6 indicates that it includes OSS/BSS and the other (the same applies to the other drawings).

Referring to FIG. 6, a work terminal 1 transmits On-board VNF Package (operation command) to OSS etc. 2 (S1).

In FIG. 6, the work terminal 1 directly transmits a VNF Package (data files) of the registration target, to OSS etc. 2 (S1), and the data files of the VNF Package is sent to NFVO 3 by a VNF Package registration request (On-board VNF Package) at OSS etc. 2 (S2). Alternatively, triggered by reception by OSS etc. 2 of On-board VNF Package (operation command) transmitted by the work terminal 1, a terminal (apparatus or node) holding data files of the VNF Package of the registration target may forward the data files of the VNF Package to the OSS etc. 2, which may in turn forward the data files of the VNF Package to NFVO 3 (S2). Further, in FIG. 6, the terminal (apparatus or node) holding the data files may be the work terminal 1.

NFVO 3 validates a VNF Descriptor (VNFD) (S3).

Figure 1:
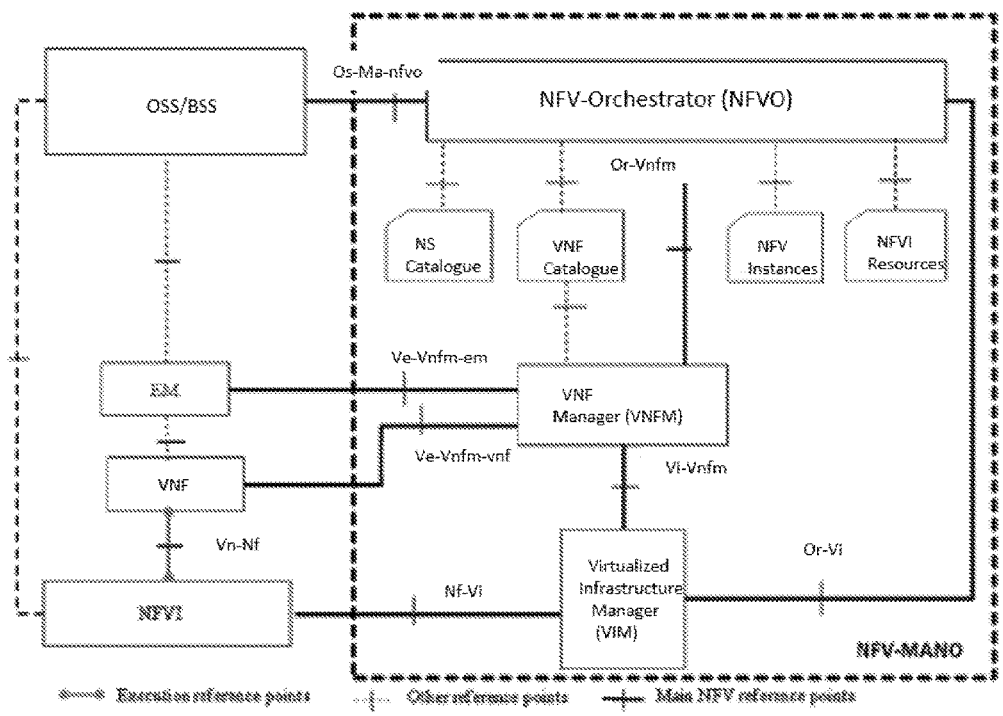
FIG. 1 is a diagram illustrating NFV-MANO in the NFV architecture (cited from FIG. 5.1 in Non-Patent Literature 1).
Figure 2:
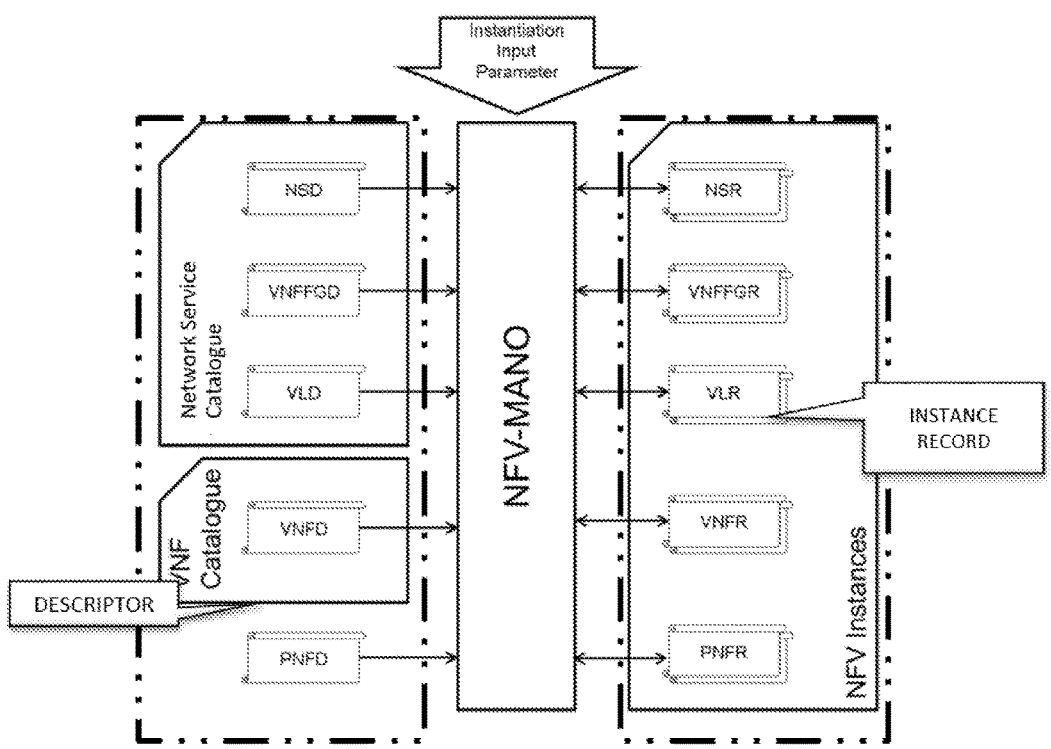
FIG. 2 is a diagram illustrating a template and instance record in Non-Patent Literature 1 (cited from FIG. 6.2 in Non-Patent Literature 1).
Figure 3:
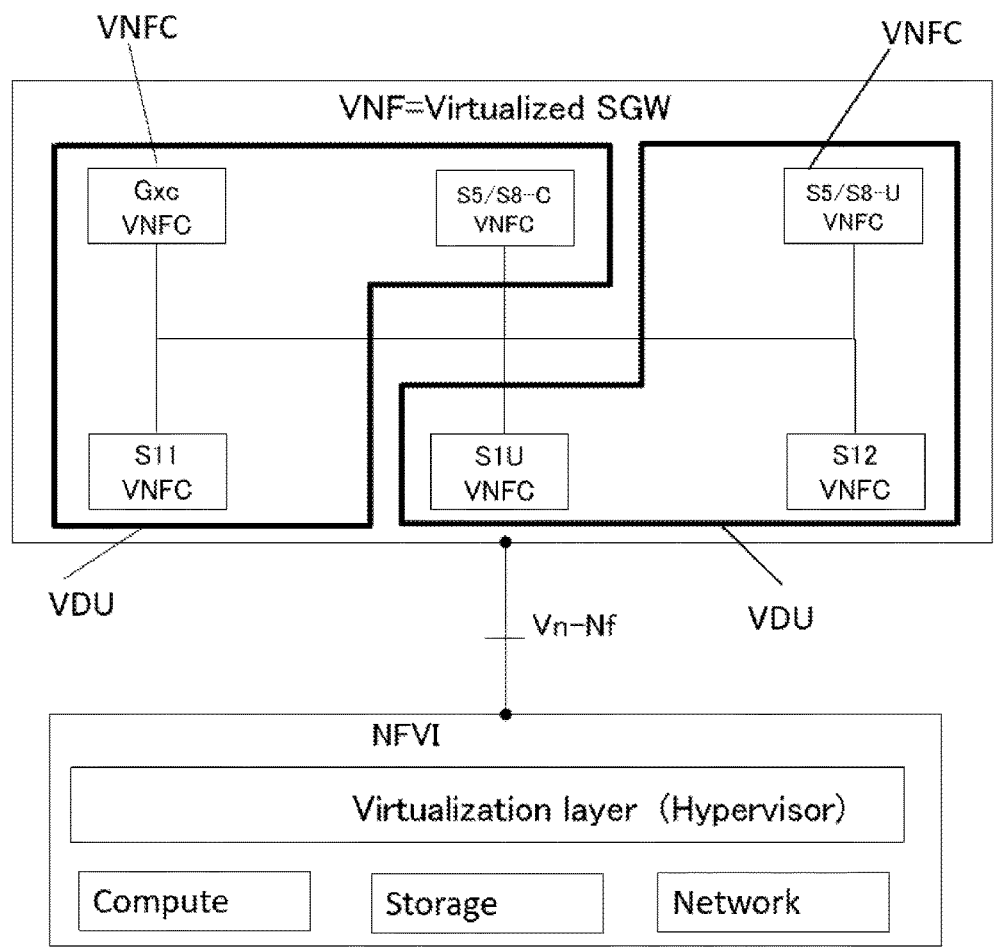
FIG. 3 is a diagram illustrating the relationship among VNF, VNFC, and VDU.

When there is no problem as a result of the validation, the VNF Package is registered (S4). The VNF Package is stored in a catalogue 31 (VNF Catalog in FIG. 2).

NFVO 3 forwards VM image file and so forth to a VIM 5 (S5).

VIM 5 registers the VM image (S6). The VM image management unit 51 stores and manages the VM image.

VIM 5 transmits an Ack (Acknowledge) response being a success response of VM image registration to NFVO 3 (S7).

NFVO 3 transmits an Ack (Acknowledge) response being a successful VM image registration to OSS etc., 2 (S8).

The OSS etc. 2 transmits the Ack (Acknowledge) response being a success response of On-board VNF Package (registration request) to the work terminal 1 (S9).

Then the work terminal 1 instructs OSS etc. 2 to perform VNF instantiation (S10). As a result, VNF invocation procedure in a VM on PM 6 is performed (S11). Note that VNF invocation procedure (VNF instantiation flow) is based on the NFV standard specification.

This reference example has, for example, the following problem.

In NFV, a VM image generally includes an execution file including a guest OS (Operating System) of a corresponding VDU. Therefore, a VNF Package or VM image tends to be larger than files in general IT (Information Technology) system or the like/other than NFV. As a result, a forwarding load also tends to increase.

Figure 7A:
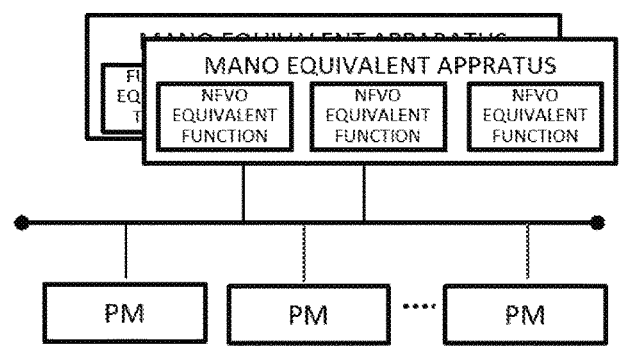
FIG. 7A is a diagram illustrating general configurations in IT systems.

In general, in IT systems other than NFV, it is known that the functions corresponding to NFVO, VNFM, and VIM are often degenerated, as schematically illustrated in FIG. 7A.

Figure 7B:
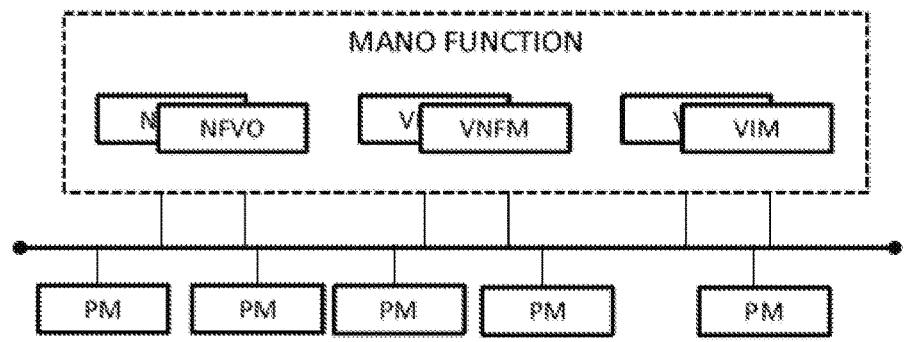
FIG. 7B is a diagram illustrating general configurations in NFV.

In NFV, a system is often configured with functions of NFVO, VNFM, and VIM separated, as schematically illustrated in FIG. 7B. In this case, such a configuration can be supposed in which communication among the functions of NFVO, VNFM, and VIM and communication between VMs (applications) on a PM (physical machine) with a delay being unacceptable are performed on the same line. In such a case, a there is a possibility that a load of forwarding a VNF Package or VM image may put pressure on a bandwidth and exert an influence (delay) on communication of VMs (applications) running on a PM.

Exemplary embodiments described below solve the problem of the reference example.

<Basic Mode: System Configuration>

Figure 8:
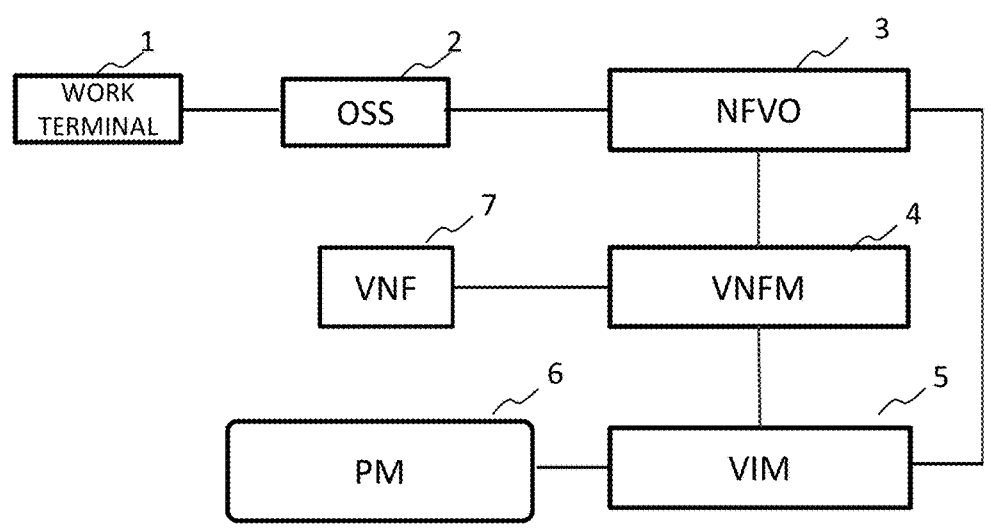
FIG. 8 is a diagram illustrating the system configuration of a basic mode.

FIG. 8 is a diagram schematically illustrating an example of a system configuration to which the present invention is applied. Referring to FIG. 8, there are provided a work terminal 1, OSS etc. 2, NFVO 3, VNFM 4, VIM 5, PM 6, and VNF 7 (VM).

<Exemplary Embodiment 1>

Figure 9:
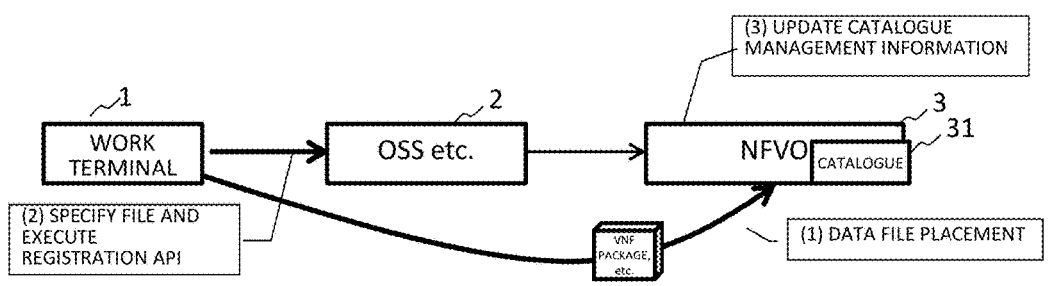
FIG. 9 is a diagram illustrating Exemplary Embodiment 1.

FIG. 9 is a diagram illustrating an operation sequence of Exemplary Embodiment 1. The system configuration of Exemplary Embodiment 1 is the same as that illustrated in FIG. 8.

In Exemplary Embodiment 1, for example, a data file (for example, a VNF Package) is placed in NFVO 3 in advance ((1) Data file placement in FIG. 9), making it possible to utilize the data file. For example, NFVO 3 includes a storage unit (not shown in the drawing) where data file(s) is(are) placed in advance. Alternatively, in NFVO 3, a storage unit that stores other kinds of information may store and hold data file(s).

Data file is forwarded, using, for example, SCP (Secure Copy Protocol) or SFTP (SSH (Secure Shell) File Transfer Protocol) via any route and placed, though not limited thereto. Alternatively, a storage medium (nonvolatile memory such as CD-ROM (Compact Disc Read-Only Memory), DVD (Digital Versatile Disk), USB (Universal Serial Bus) memory, and SD memory card) is directly attached to an apparatus equipped with function units of NFVO 3 and VIM 5, and the data file is placed therein.

According to Exemplary Embodiment 1, in the work terminal 1, there is provided an API (Application Programming Interface) that by specifying a file path of the data file already placed, registers the data file and enables usage of the file ((2) of FIG. 9, Specify file and execute registration API). As a result, catalogue management information of NFVO 3 is updated ((3) of FIG. 9, Update catalogue management information).

As described, according to Exemplary Embodiment 1, a data file placed in advance in NFVO 3 or VIM 5, can be used, as a result of which, the number of times of uploading and forwarding decreases, thereby reducing a forwarding load in the system.

Further, according to Exemplary Embodiment 1, uploading and forwarding can be performed at any time, and via any route, making it possible to reduce influence of a processing load of forwarding a VNF Package or VM image exerted on other processing. The data file may be placed in NFVO using a storage medium that does not require a network, or data file may be forwarded during a period of time when the forwarding does not exert influence on other processing.

Figure 10A:
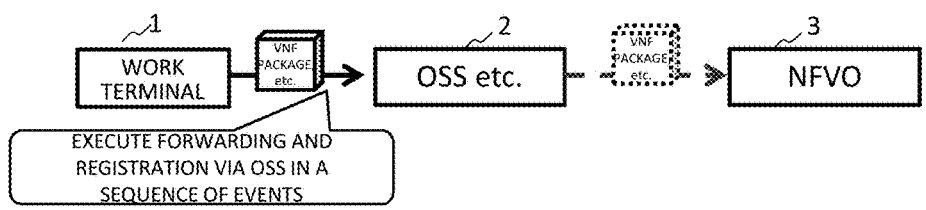
FIG. 10A is a diagram illustrating Reference Example.
Figure 10B:
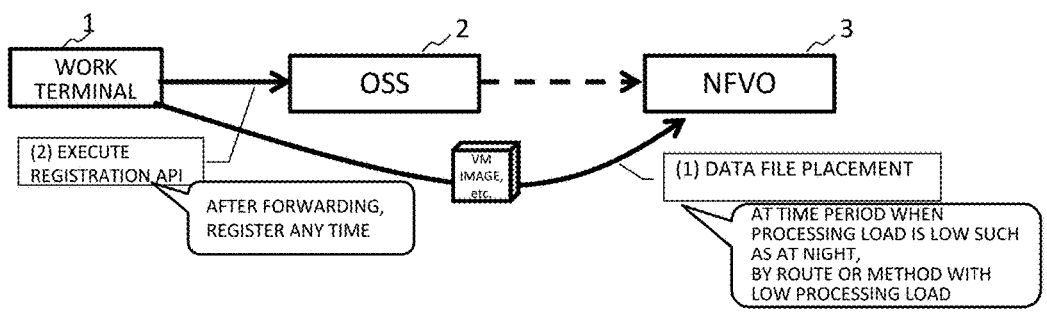
FIG. 10B is a diagram illustrating Exemplary Embodiment 1 respectively.

FIG. 10A is a diagram illustrating the Reference Example in FIG. 5. FIG. 10B is a diagram illustrating Exemplary Embodiment 1.

As illustrated in FIG. 10A, in the case of the Reference Example, file forwarding and registration of a VNF Package from the work terminal 1 via the OSS etc. 2 are performed in a series of flow. As a result, in registration of a VNF Package, upload processing occurs twice as follows.

Uploading from the terminal holding the data file to the OSS etc.; and

Uploading from OSS etc. 2 to NFVO.

Since a VNF Package includes a VM image and VNFD constituting a VNF as described above, it can be supposed that a data amount of the VNF Package becomes large. Therefore, it can be supposed that a time required to perform an upload process becomes longer. Two upload processing required in the Reference Example approximately double the forwarding time, thereby becoming a burden for a maintenance operator (worker) and increasing an influence exerted by the forwarding load on other processing.

On the other hand, according to Exemplary Embodiment 1, as illustrated in FIG. 10B, the number of VNF Package upload processing can be reduced and time shortening can be achieved by placing a data file such as a VNF Package, before registration and registering the data file at any time thereafter. Further, data file forwarding processing can be prevented from exerting influence on other processing, by placing the data file in advance during a time period when a processing load is low such as at night or using a route with a low processing load or a storage medium, and executing the registration API at any time (when necessary) after the data file has been placed.

<Example of Sequence Operation of Exemplary Embodiment 1>

Figure 11:
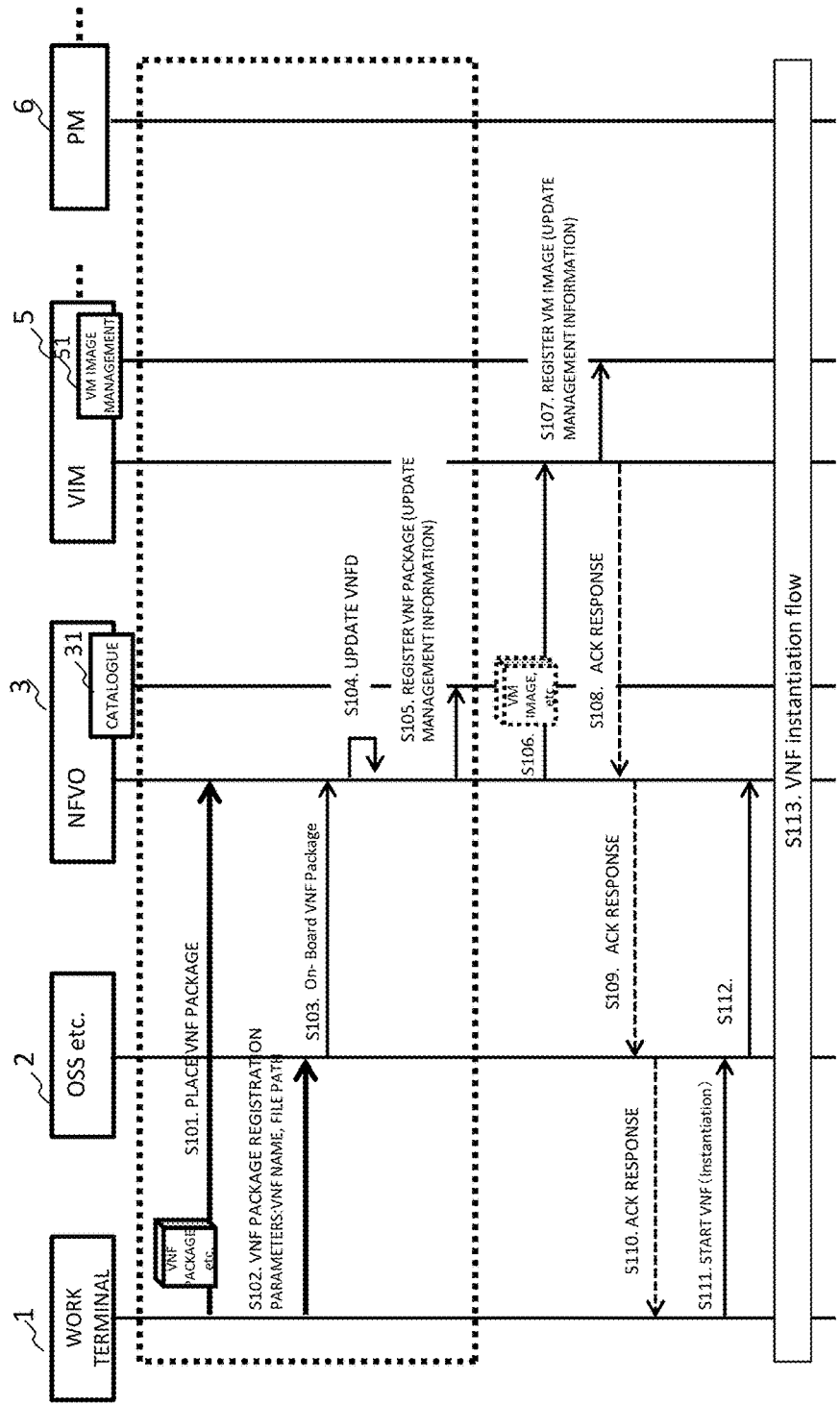
FIG. 11 is a diagram illustrating an operation sequence of Exemplary Embodiment 1.

FIG. 11 is a diagram illustrating an example of an operation sequence of Exemplary Embodiment 1. Sequence numbers are given to typical steps in FIG. 11. Further, sequence numbers S101 to S105 surrounded by a broken line in FIG. 11 substantially correspond to the subject of the invention.

Referring to FIG. 11, the work terminal 1 places a VNF Package in NFVO 3 (S101). In this case, the data file may be placed in NFVO, etc., using a storage medium that does not use a network, or the data file is forwarded during a time period when the forwarding processing does not exert influence on other processing.

The VNF Package is registered from the work terminal 1 (S102). For example, in order to specify a VNF Package already placed in NFVO 3, a VNF name and file path (a path name of the VNF Package already placed in NFVO 3) are entered, as a setting of VNF Package registration (On-board VNF Package), from the work terminal 1, using the registration API. An entry in which a VNF name and file path are input is provided in an API registering a VNF Package.

OSS etc. 2 forwards a VNF Package registration request (On-board VNF Package) to NFVO 3 (S103). The VNF Package registration request (On-board VNF Package) corresponds to Operations in FIG. 4A, to which a VNL name and file path specified are added.

NFVO 3 updates VNFD (VNF Descriptor) corresponding to the VNF Package according to the VNF Package registration request (S104). VNFD is stored and managed in the catalogue 31 (VNF Catalog) in NFVO 3.

NFVO 3 registers the VNF Package (updates management information) (S105).

NFVO 3 transmits a VM image to VIM 5 (S106).

VIM 5 registers the VM image in the VM image management unit 51 (storage unit) (updating management information in the VM image management unit 51) (S107).

VIM 5 transmits an Ack response for notifying a success (completion) of the VM image registration to NFVO 3 (S108). Note that, if the registration fails, VIM 5 returns a negative acknowledgment (Nack) to NFVO 3.

Upon receiving the Ack from VIM 5, NFVO 3 transmits an Ack response for notifying of a success of the VNF Package registration to OSS etc. 2 (S109).

Upon receiving the Ack from NFVO 3, OSS etc. 2 transmits an Ack response for notifying of a success of the VNF Package registration to the work terminal 1 (S 110).

The work terminal 1 enters an instruction of VNF instantiation (S111).

The instruction of VNF instantiation is transmitted from OSS etc. 2 to NFVO 3 (S112).

NFVO 3, VIM 5, and PM 6 execute a VNF instantiation flow (S113).

According to Exemplary Embodiment 1, the data file forwarding processing can be prevented from exerting influence on other processing, by placing a VNF Package in a sequence 1 in advance during a time period when processing load is low such as at night or using a route with a low processing load, or a storage medium, and executing the registration API at any time (when necessary) after the data file has been placed.

<Exemplary Embodiment 2>

Figure 12:
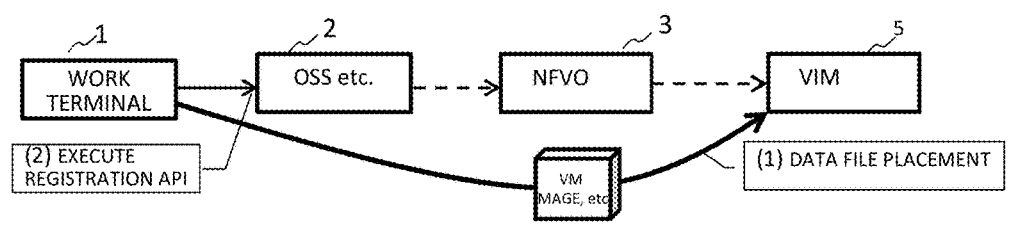
FIG. 12 is a diagram illustrating Exemplary Embodiment 2.

FIG. 12 is a diagram illustrating Exemplary Embodiment 2. A system configuration of Exemplary Embodiment 2 is the same as that of Exemplary Embodiment 1 illustrated in FIG. 8.

In the Reference Example in FIG. 6, from registration of a VNF Package to delivery thereof to VIM, there are required three upload processing, such as:

from a terminal holding the data file to OSS etc. 2 (S1 in FIG. 6);

From OSS etc. 2 to NFVO 3 (S2 in FIG. 6); and

From NFVO 3 to VIM 5 (S5 in FIG. 6)

In Exemplary Embodiment 2, a terminal or an apparatus holding a VM image directly places VM image in VIM 5 before registration ((1) Data file placement in FIG. 12). In this case, as in Exemplary Embodiment 1, VM image is placed in VIM 5 in advance, during a time period when a processing load is low such as at night or using a route with a low processing load, or a storage medium. VIM 5 includes a storage unit (not illustrated in the drawing) to storing a data file (VM image) in advance. Alternatively, VIM 5 may store and hold the data file (VM image) in a storage unit that stores other items of information.

After the VM image is placed in VIM 5, a work terminal 1 registers the VM image in VIM 5 using a registration API ((2) Execute registration API in FIG. 12).

According to Exemplary Embodiment 2, compared with Exemplary Embodiment 1, efficiency can be further improved by directly placing a VM image in VIM in advance, and making the VM image registered into VIM from the work terminal 1 etc., by using a registration API. In other words, Exemplary Embodiment 2, unnecessitates forwarding of VM image (forwarding from NFVO to VIM; S106 in FIG. 11) in registration of the VM image, and is able to prevent file forwarding processing from exerting influence upon other processing.

<An Example of Operation Sequence of Exemplary Embodiment 2>

Figure 13:
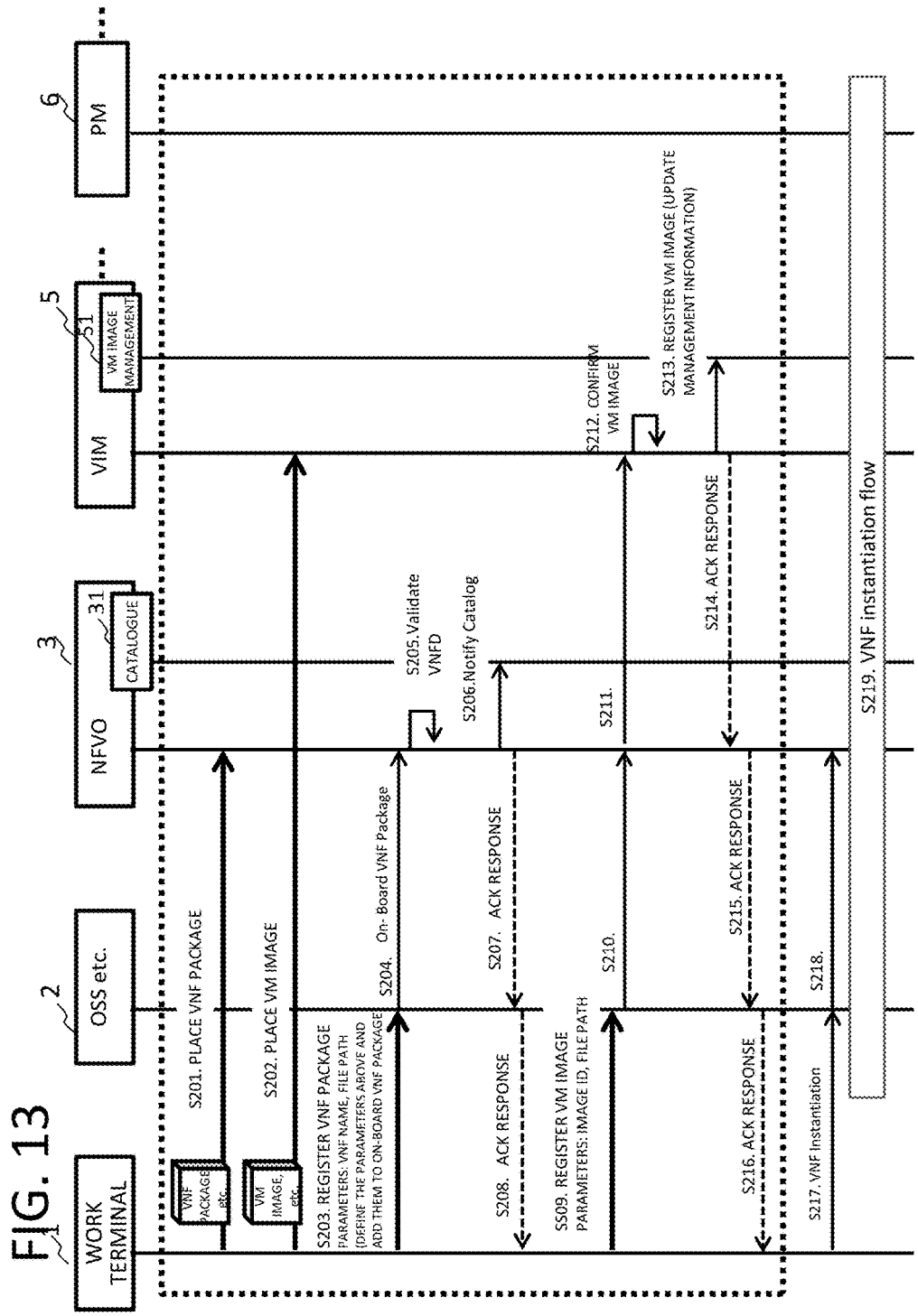
FIG. 13 is a diagram illustrating an operation sequence of Exemplary Embodiment 2.

FIG. 13 is a diagram illustrating an example of operation sequence of Exemplary Embodiment 2. Sequence numbers are given to typical steps in FIG. 13 for the sake of explanation. Steps surrounded by a broken line in FIG. 13 correspond to the exemplary embodiment of the subject of the present invention.

With reference to FIG. 13, a VNF Package is placed in NFVO 3 by a terminal holding a data file (work terminal 1 in FIG. 13) (S201). In this case, the data file is placed in NFVO, etc., using a storage medium without using a network, or the data file is forwarded during a time period when forwarding does not exert influence upon other processing.

Then, the work terminal 1 places a VM image in VIM 5 (S202).

For example, in order to specify the VNF Package already placed, a VNF name and file path are entered from the work terminal 1 as a VNF Package registration request using a registration API (S203). An entry in which a VNF name and file path are input is provided in API registering a VNF Package.

From OSS etc. 2, the VNF Package registration request is forwarded to NFVO 3 (S204).

NFVO 3 validates VNFD (VNF Descriptor) corresponding to the VNF Package based on the VNF Package registration request (Validate VNFD) (S205) (corresponding to 2. Validate VNFD in FIG. 4B).

NFVO 3 notifies to the catalogue (S206) (corresponding to 3. Notify Catalog in FIG. 4B).

NFVO 3 transmits an Ack response for notifying a success of the VNF Package registration to OSS etc. 2 (S207).

On reception of the Ack from NFVO 3, OSS etc. 2 transmits an Ack response for notifying of a success of the VNF Package registration to the work terminal 1 (S208).

For example, in order to register the VM image an already placed, a VM image ID and file path are entered as a VM image registration request from the work terminal 1, using the registration API (S209).

The VM image registration request is forwarded from OSS etc. 2 to VIM 5 via NFVO 3 (S210, S211).

VIM 5 confirms the VM image (S212).

VIM 5 registers the VM image (updates management information) (S213).

VIM 5 transmits an Ack response for notifying a success of the VM image registration to NFVO 3 (S214).

On reception of the Ack from VIM 5, NFVO 3 transmits an Ack response for notifying of the success of the VNF Package registration to OSS etc. 2 (S215).

On reception of the Ack from NFVO 3, OSS etc. 2 transmits an Ack response for notifying of the success of the VNF Package registration to the work terminal 1 (S216).

On the work terminal 1, an instruction to instantiate VNF (VNF instantiation) is entered (S217).

The instruction of VNF instantiation is transmitted from OSS etc. 2 to NFVO 3 (S218).

NFVO 3, VIM 5, and PM 6 execute a VNF instantiation flow (S219).

As illustrated in FIG. 13, Exemplary Embodiment 2 does not require a forwarding sequence of a VM image from NFVO 3 to VIM 5 (S106 in FIG. 11).

<Exemplary Embodiment 3>

Figure 14:
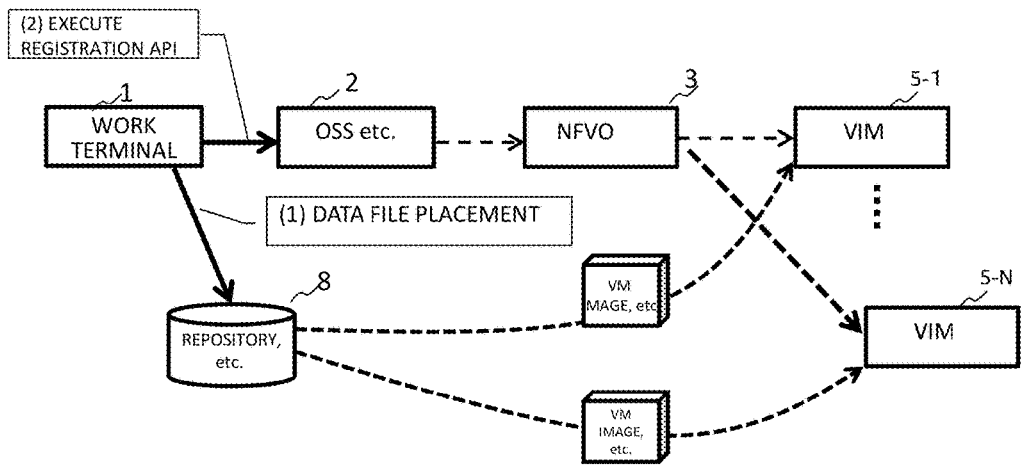
FIG. 14 is a diagram illustrating Exemplary Embodiment 3.

FIG. 14 is a diagram illustrating Exemplary Embodiment 3. In Exemplary Embodiment 3, the present invention is applied to a system in which a plurality of apparatuses share a data file. For example, when a plurality of VIMs are provided in a plurality of sites different to each other, a data file to be registered is placed in a repository 8 ((1) in FIG. 14). The repository 8 is a storage unit (repository) that stores in one place a plurality of data files (for example, VM images, etc.) used for registration by a plurality of VIMs 5. A plurality of the repositories 8 may also be provided, depending on the number of sites where a plurality of VIMs 5 are provided, and location/position of the sites.

At a stage before registration processing, the repository 8 places a VM image in a plurality of VIMs 5-1 to 5-N (N is a positive integer of 2 or more).

By executing Registration API, the VM image is registered in the plurality of VIMs 5-1 to 5-N ((2) in FIG. 14). Each VIM 5 registers the VM image using the already placed VM image. In other words, forwarding of a VM image from NFVO 3 to VIM 5 (S106 in FIG. 11) is omitted in Exemplary embodiment 3. As a result, file forwarding load at the time of registration can be further reduced. Although the case where a VM image is used, is described in Exemplary Embodiment 3, a case where a VNF Package is used may well be applied.

Each disclosure of the above-listed Non Patent Literature 1 is incorporated herein by reference. Modification and adjustment of each exemplary embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept.

The invention claimed is:

1. A data file registration management method comprising:
   sending a data file including information about a Virtual Network Function (VNF) over a selected network path of a plurality of network paths from a node to a management apparatus, wherein each of the plurality of network paths has a respective processing load, and wherein the selected network path has the lowest processing load among the plurality of network paths;
   storing the data file on the management apparatus during a selected time period, wherein the selected time period is one of a plurality of time periods during which a processing load of the management apparatus varies, and wherein the selected time period occurs when the processing load of the management apparatus is the lowest among the plurality of time periods;
   receiving, at a terminal, an acknowledgement over the network from the management apparatus indicating that the sending and the storing of the data file have successfully completed;
   sending a request for the data file from the terminal to the management apparatus over the network after receiving the acknowledgement; and
   registering the requested data file in a storage unit by the management apparatus, wherein the registering includes entering a name and file path of the VNF using a registration Application Programming Interface (API) on the terminal.

2. The data file registration management method according to claim 1, wherein the data file includes a data file in a VNF Package, and
   the management apparatus includes a Network Functions Virtualization Orchestrator (NFVO) that registers the VNF Package.

3. The data file registration management method according to claim 1, wherein the data file includes a Virtual Machine (VM) image, and
   the management apparatus includes a Virtualized Infrastructure Manager (VIM) that performs registration of the VM image.

4. The data file registration management method according to claim 2, further comprising:
   storing, before sending the request to the NFVO, the VNF Package in the NFVO from the node holding the VNF Package, via the network or a storage medium; and
   sending, to the NFVO, as a registration request, a VNF Package registration request that specifies the VNF Package stored in the NFVO.

5. The data file registration management method according to claim 3, further comprising:
   storing, before sending the request to the NFVO, the VM image in the VIM from the node holding the VM image, via the network or a storage medium; and
   sending, to the VIM, as a registration request, a VM image registration request that specifies the VM image stored in the VIM.

6. The data file registration management method according to claim 1, further comprising:
   storing, in the storage unit, a plurality of data files to be stored in a plurality of management apparatuses before making a registration request to the plurality of management apparatuses; and
   registering, by each of the plurality of management apparatuses, after the storing, in each of a plurality of the management apparatuses, a corresponding one of the data files from the storage unit.

7. A data file registration management system comprising:
   a management apparatus comprising:
   a receiver, wherein the receiver is configured to:
   receive a data file including information about a Virtual Network Function (VNF) over a selected network path of a plurality of network paths of a network from a node to the management apparatus, wherein each of the plurality of network paths has a respective processing load, and wherein the selected network path has the lowest processing load among the plurality of network paths;
   a processor; and
   a memory storing program instructions executable by the processor,
   wherein the processor is configured to:
   store, upon receiving the data file by the receiver over the network, the data file in the memory during a selected time period, wherein the selected time period is one of a plurality of time periods during which a processing load of the management apparatus varies, and wherein the selected time period occurs when the processing load of the management apparatus is the lowest among the plurality of time periods; and
   a terminal comprising:
      a receiver that receives an acknowledgement over the network from the management apparatus indicating that the receiving and the storing of the data file have successfully completed;
      a transmitter that transmits a request for the data file to the management apparatus over the network after receiving the acknowledgement, wherein the management apparatus registers the requested data file in a storage unit, and wherein the registering includes entering a name and file path of the VNF using a registration Application Programming Interface (API) on the terminal.

8. The data file registration management system according to claim 7, wherein the data file includes a data file in a VNF Package, and
   the management apparatus operates as a Network Functions Virtualization Orchestrator (NFVO) that performs the registration of the data file in the VNF Package.

9. The data file registration management system according to claim 7, wherein the data file includes a Virtual Machine (VM) image, and
   the management apparatus operates as a Virtualized Infrastructure Manager (VIM) that performs registration of the VM image.

10. The data file registration management system according to claim 7, wherein a plurality of data files to be stored in a plurality of the management apparatuses are stored in the storage unit before making a registration request, and wherein each of the plurality of management apparatuses performs the registration, after storing a corresponding one of the data files to each of the plurality of management apparatuses, from the storage unit.

11. A management apparatus comprising:
   a processor;
   a memory storing program instructions executable by the processor;

a receiver that receives a data file including information about a Virtual Network Function (VNF) over a selected network path of a plurality of network paths of a network from a node to the management apparatus, wherein each of the plurality of network paths has a respective processing load, and wherein the selected network path has the lowest processing load among the plurality of network paths a first storage that stores the data file on the management apparatus during a selected time period, wherein the selected time period is one of a plurality of time periods during which a processing load of the management apparatus varies, and wherein the selected time period occurs when the processing load of the management apparatus is the lowest among the plurality of time periods;

a transmitter that transmits an acknowledgement over the network indicating that the receiving and the storing of the data file have successfully completed to a terminal, wherein the terminal sends a request for the data file to the management apparatus over the network after receiving the acknowledgement;

a second storage that stores registration results, wherein the processor is configured to:

read the data file from the first storage, register the data file, wherein the registering includes entering a name and file path of the VNF using a registration Application Programming Interface (API) on the terminal, and register a result of the registration in the second storage, and wherein the transmitter is configured to return a registration response to the terminal.

12. The management apparatus according to claim 11, wherein the data file includes a data file in a VNF Package, and the management apparatus is a Network Function Virtualization Orchestrator (NFVO).

13. The management apparatus according to claim 11, wherein the data file includes a Virtual Machine (VM) image, and the management apparatus is a Virtualized Infrastructure Manager (VIM).

14. A non-transitory computer-readable recording medium storing therein a program causing a computer execute processing comprising:

sending a data file including information about a Virtual Network Function (VNF) over a selected network path of a plurality of network paths from a node to a management apparatus, wherein each of the plurality of network paths has a respective processing load, and wherein the selected network path has the lowest processing load among the plurality of network paths;

storing the data file on the management apparatus during a selected time period, wherein the selected time period is one of a plurality of time periods during which a processing load of the management apparatus varies, and wherein the selected time period occurs when the processing load of the management apparatus is the lowest among the plurality of time periods;

receiving, at a terminal, an acknowledgement over the network from the management apparatus, indicating that the sending and the storing of the data file have successfully completed;

sending a request for the data file from the terminal to the management apparatus over the network after receiving the acknowledgement; and registering the requested data file in a storage unit by the management apparatus, wherein the registering includes entering a name and file path of the VNF using a registration Application Programming Interface (API) on the terminal.

15. The non-transitory computer readable recording medium according to claim 14, wherein the data file is a data file in a VNF Package, and the computer constitutes a Network Function Virtualization Orchestrator (NFVO).

16. The non-transitory computer readable recording medium according to claim 14, wherein the data file is a Virtual Machine (VM) image, and the computer constitutes a Virtualized Infrastructure Manager (VIM).

* * * * *

UNITED STATES PATENT AND TRADEMARK OFFICE
CERTIFICATE OF CORRECTION

PATENT NO. : 10,469,313 B2
APPLICATION NO. : 15/546330
DATED : November 5, 2019
INVENTOR(S) : Mayo Oohira et al.

Page 1 of 1

It is certified that error appears in the above-identified patent and that said Letters Patent is hereby corrected as shown below:

In the Claims

Column 18, Line 4; In Claim 14, after "computer", insert --to--

Signed and Sealed this
Twenty-fourth Day of November, 2020

Andrei Iancu
*Director of the United States Patent and Trademark Office*